(12) United States Patent
Yeh et al.

(10) Patent No.: US 8,419,228 B2
(45) Date of Patent: Apr. 16, 2013

(54) LIGHT GUIDE MEMBER, LIGHT IRRADIATION MODULE WITH THE LIGHT GUIDE MEMBER AND ELECTRIC DEVICE WITH THE LIGHT IRRADIATION MODULE

(75) Inventors: Chen-Ping Yeh, Banqiao (TW); Yen-Ching Wang, Xindian (TW)

(73) Assignee: Quanta Computer Inc., Taoyuan Shien (TW)

( * ) Notice: Subject to any disclaimer, the term of this patent is extended or adjusted under 35 U.S.C. 154(b) by 365 days.

(21) Appl. No.: 12/805,407

(22) Filed: Jul. 29, 2010

(65) Prior Publication Data
US 2012/0026730 A1 Feb. 2, 2012

(51) Int. Cl.
*G02B 6/00* (2006.01)
(52) U.S. Cl.
USPC .......................................................... 362/309
(58) Field of Classification Search .................. 362/615, 362/617, 619, 621, 625, 628, 309
See application file for complete search history.

(56) References Cited

U.S. PATENT DOCUMENTS

| 6,193,383 | B1 * | 2/2001 | Onikiri et al. ................... 362/26 |
| 6,536,921 | B1 * | 3/2003 | Simon .......................... 362/277 |
| 6,719,442 | B1 * | 4/2004 | Chen ............................ 362/328 |
| 7,976,192 | B2 * | 7/2011 | Chinniah et al. ......... 362/249.06 |
| 2004/0223315 | A1 * | 11/2004 | Suehiro et al. ................... 362/84 |
| 2005/0068777 | A1 * | 3/2005 | Popovic ........................ 362/307 |
| 2005/0083686 | A1 * | 4/2005 | Yatsuda et al. ................ 362/230 |
| 2006/0044814 | A1 * | 3/2006 | Ikeda ............................. 362/382 |
| 2006/0171151 | A1 * | 8/2006 | Park et al. ..................... 362/327 |
| 2007/0273984 | A1 * | 11/2007 | Pao et al. ...................... 359/726 |
| 2008/0019139 | A1 * | 1/2008 | Dubosc et al. ................ 362/511 |

* cited by examiner

*Primary Examiner* — Nimeshkumar Patel
*Assistant Examiner* — Christopher Raabe
(74) *Attorney, Agent, or Firm* — Rabin & Berdo, P.C.

(57) ABSTRACT

A light guide member and a light irradiation module with the light guide member and an electric device with the light irradiation module are provided in the invention in which the light guide member has a cone shaped body and a ring shaped flange. The cone shaped body has an opening at an apex of one end of the cone shaped body. The ring shaped flange is extended from a circular rim of the other end of the cone shaped body. One inner surface of the opening is defined as a light incident surface, and a circular rim surface of the ring shaped flange surrounding the cone shaped body is defined as a light emitting surface.

15 Claims, 7 Drawing Sheets

LIGHT GUIDE MEMBER, LIGHT IRRADIATION MODULE WITH THE LIGHT GUIDE MEMBER AND ELECTRIC DEVICE WITH THE LIGHT IRRADIATION MODULE

BACKGROUND

1. Technical Field

The invention relates to a light guide member, more particularly to a cone shaped light guide member and a light irradiation module with the cone shaped light guide member and an electric device with the light irradiation module.

2. Description of Related Art

In conventional arts, light guide modules include a light source and a light guide plate in which the light guide plate has a light incident surface and a light emitting surface thereon, and the light source is disposed at the light incident surface of the light guide plate. The light guide plate guides light beams generated from the light source towards the light emitting surface to form a plane light source via the light incident surface thereof. The light guide plate is served for properly leading a transmissive direction of the light beams so as to provide a plane light source with high illumination and good light uniformity. Normally, the light guide plate degrades the total internal reflection condition of light beams that is transmitted internally inside the light guide plate, and scatters the light beams in the light guide plate to improve the light uniformity of light beams irradiated out of the light outputting surface of the light guide plate.

As manufacturing methods of light guide plate are changed advanced, types of light outputting surface of the light guide plate evolve from plane type of light outputting surface to curved type of light outputting surface so as to satisfy different needs of light outputting surface thereof. However, to adopt the different types of light outputting surface of the light guide plate into an apparatus may need more disposing space of the apparatus for the light guide plate and the light sources in order to provide the corresponding type of plane light source.

Therefore, how to develop an improved solution capable of solving the mentioned disadvantages shall be seriously concerned.

SUMMARY

One objective of the present invention is to provide a light guide member and a light irradiation module with the light guide member and an electric device with the light irradiation module, which can guide light beams to provide a ring shaped plane light source.

One objective of the present invention is to provide a light guide member and a light irradiation module with the light guide member and an electric device with the light irradiation module, which can save disposing space of the electric device for accommodating the light guide plate, and save the quantity of LED elements of the light source.

To achieve these and other advantages and in accordance with the objective of the present invention, as the embodiment broadly describes herein, a light guide member has a cone shaped body. The cone shaped body has an opening at an apex of one end of the cone shaped body, and a ring shaped flange extended from a circular rim of the other end of the cone shaped body. The opening is served for being installed a light source therein, thus, one inner surface of the opening is defined as a light incident surface, and a circular rim surface of the ring shaped flange surrounding the cone shaped body is defined as a light emitting surface.

According to another aspect of the present invention, the light irradiation module provided in the present invention includes the light guide member mentioned above and a light source with a circuit board, a first LED element and a second LED element. The first LED element is disposed on a first side of the circuit board, extended into the opening, and capable of irradiating lights towards one part of the light incident surface, and the second LED element is disposed on a second side of the circuit board opposite to the first side thereof, extended into the opening, and capable of irradiating lights towards the other part of the light incident surface.

According to the other aspect of the present invention, an electric device provided in the present invention includes a case, the light guide member mentioned above and the light source mentioned above. The case has an internal space therein and an external surface thereon. The light irradiation module is disposed in the internal space, and the light irradiation module includes a light guide member with a cone shaped body with an opening and a ring shaped flange. The opening is arranged at an apex of one end of the cone shaped body, and the ring shaped flange is extended from a circular rim of the other end of the cone shaped body, and the ring shaped flange is exposed outwards the external surface of the case with a circular rim surface of the ring shaped flange to encircle the external surface of the case. One inner surface of the opening is defined as a light incident surface, and the circular rim surface of the ring shaped flange is defined as a light emitting surface.

In one embodiment of the present invention, the electric device is a laptop, and the case is for a pivot of the laptop.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention is to disclose a light guide member and a light irradiation module with the light guide member and an electric device with the light irradiation module.

Figure 1A:
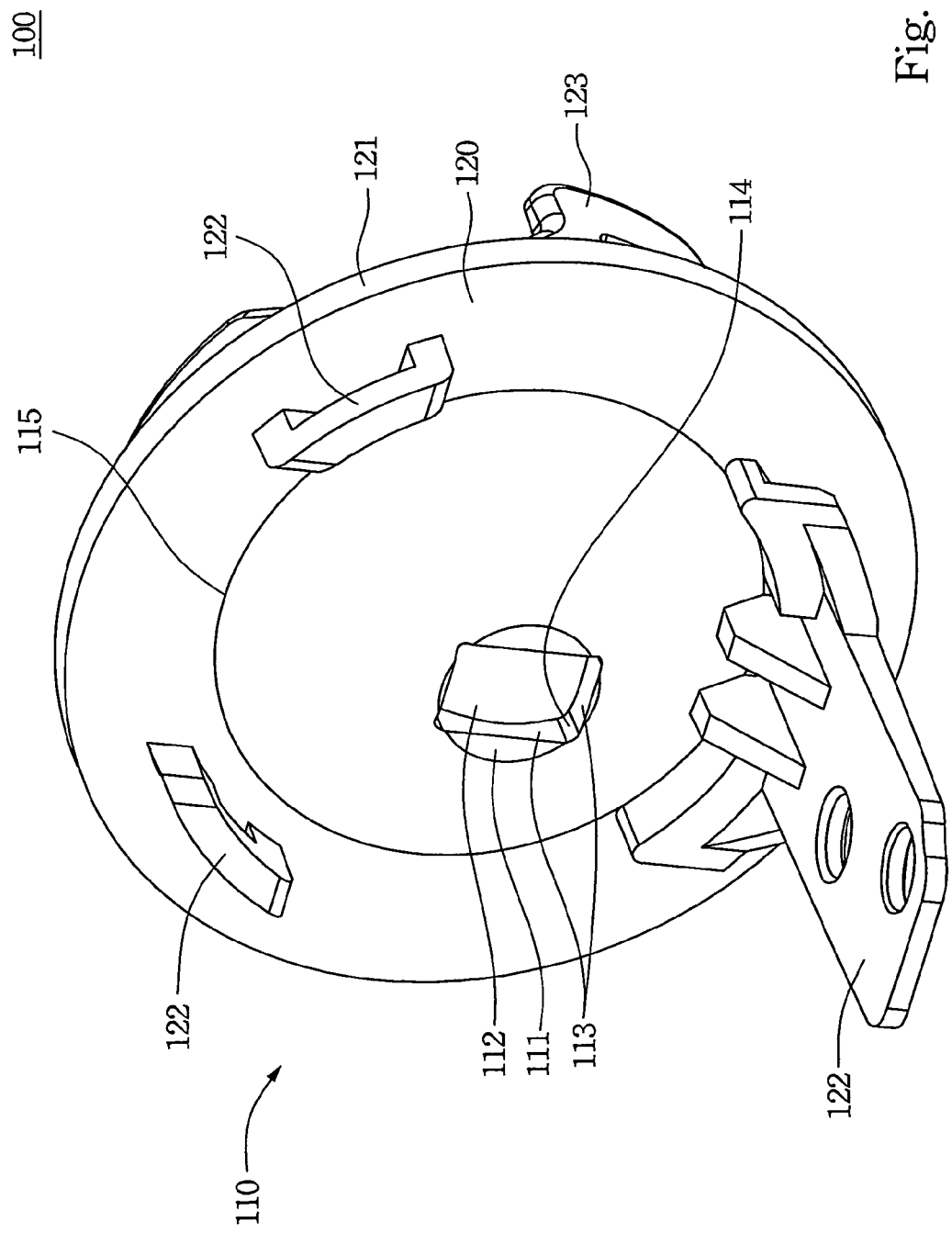
FIG. 1A and FIG. 1B illustrate a light guide member according to one embodiment of the present invention observed from two different directions.
Figure 1B:
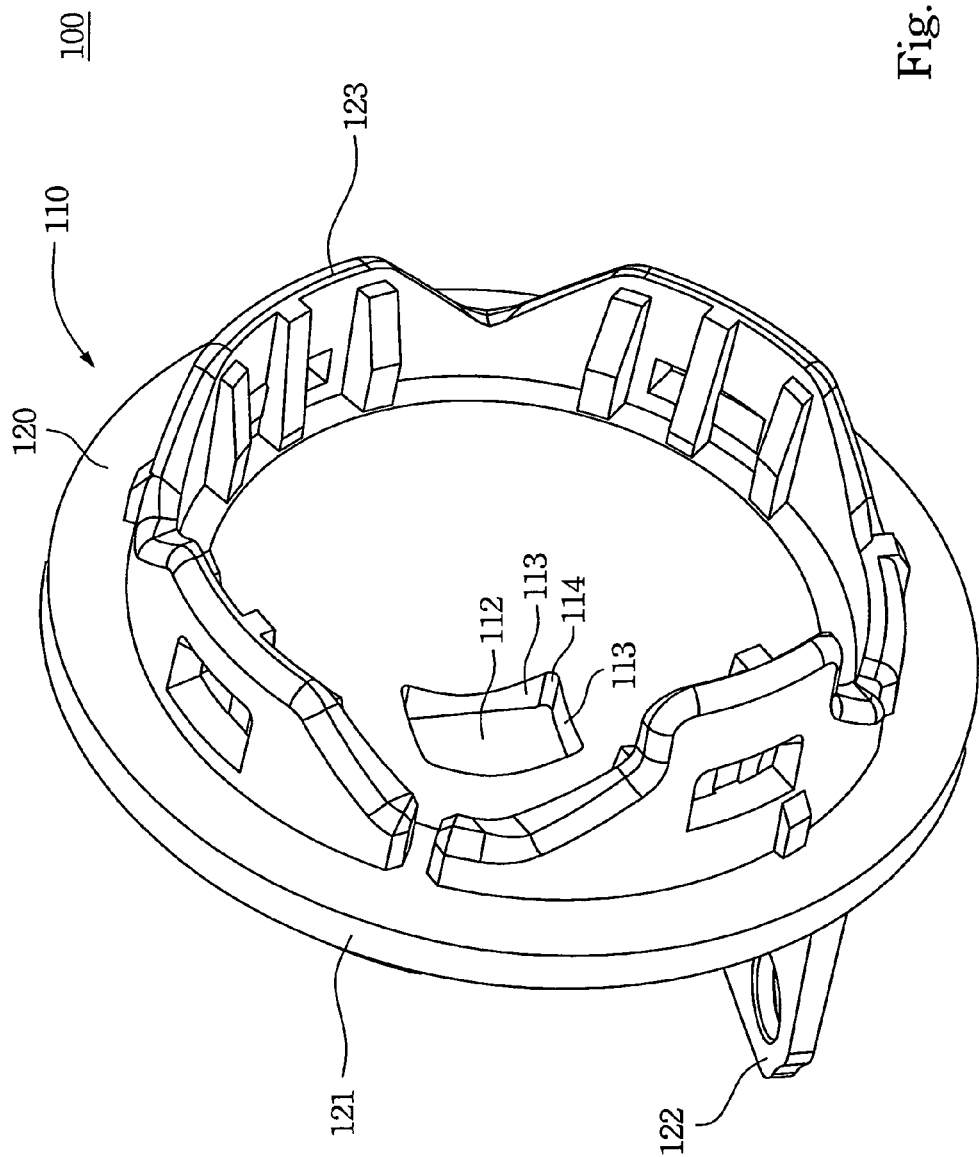

Refer to FIG. 1A and FIG. 1B in which FIG. 1A and FIG. 1B illustrate a light guide member 100 according to one embodiment of the present invention observed from two different directions.

The light guide member 100 has a cone shaped body 110. The cone shaped body 110 is hollow, and substantially protrudes at one end thereof, and forms an opening 112 at an apex 111 of the end thereof, and the cone shaped body 110 substantially has a circular rim 115 that surrounds the other end thereof. The cone shaped body 110 further integrally has a ring shaped flange 120. The ring shaped flange 120 as an annulus, is extended from the circular rim 115 of the other end of the cone shaped body 110. Furthermore, the entire inner surface(s) 113 of the opening 112 can be defined as a light incident surface for receiving lights, and a circular rim surface 121 of the ring shaped flange 120 surrounding the cone shaped body 110 can be defined as a light emitting surface for emitting light outwardly.

Figure 2A:
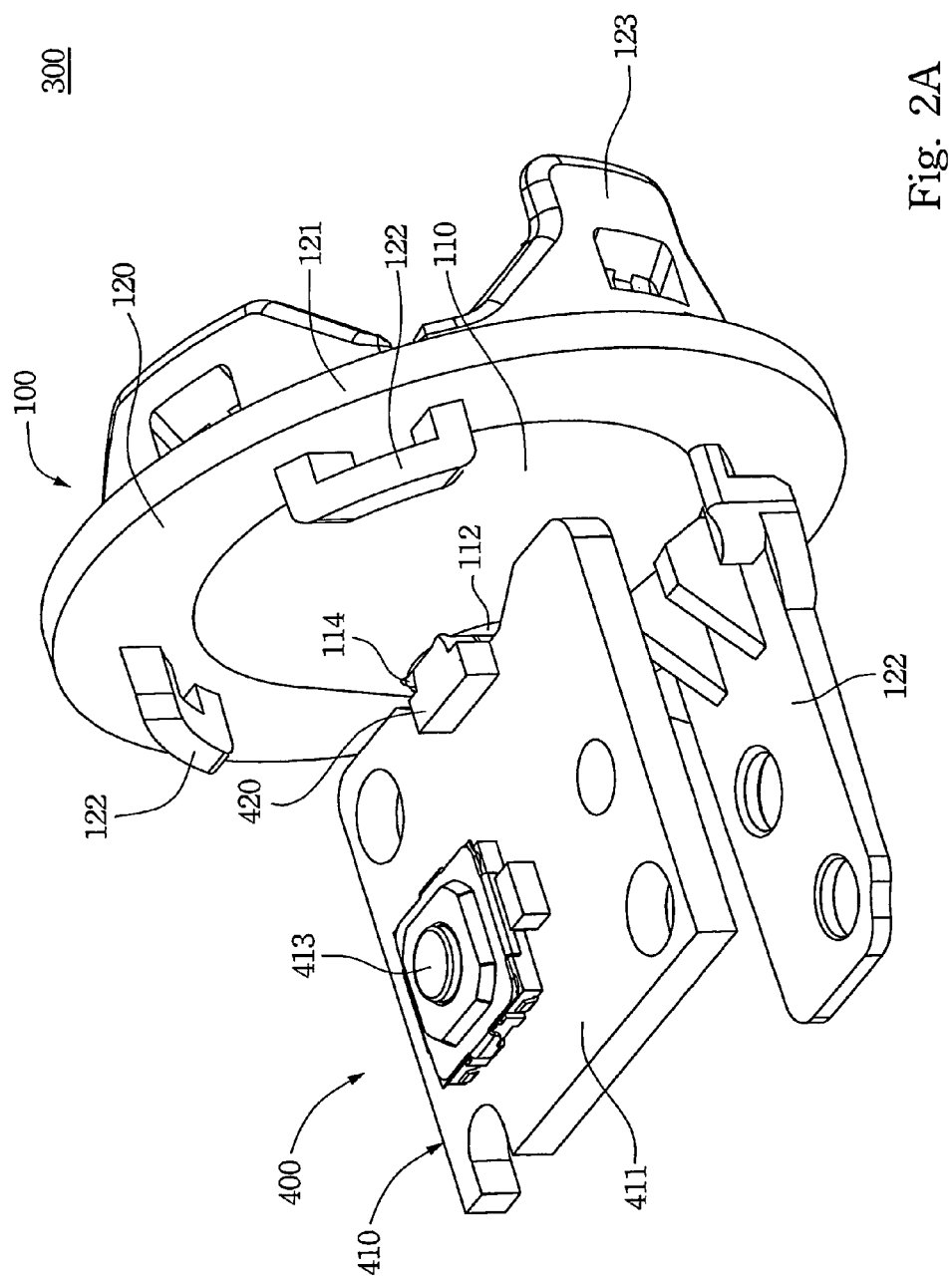
FIG. 2A and FIG. 2B illustrate a light irradiation module according to another embodiment of the present invention observed from two different directions.
Figure 2B:
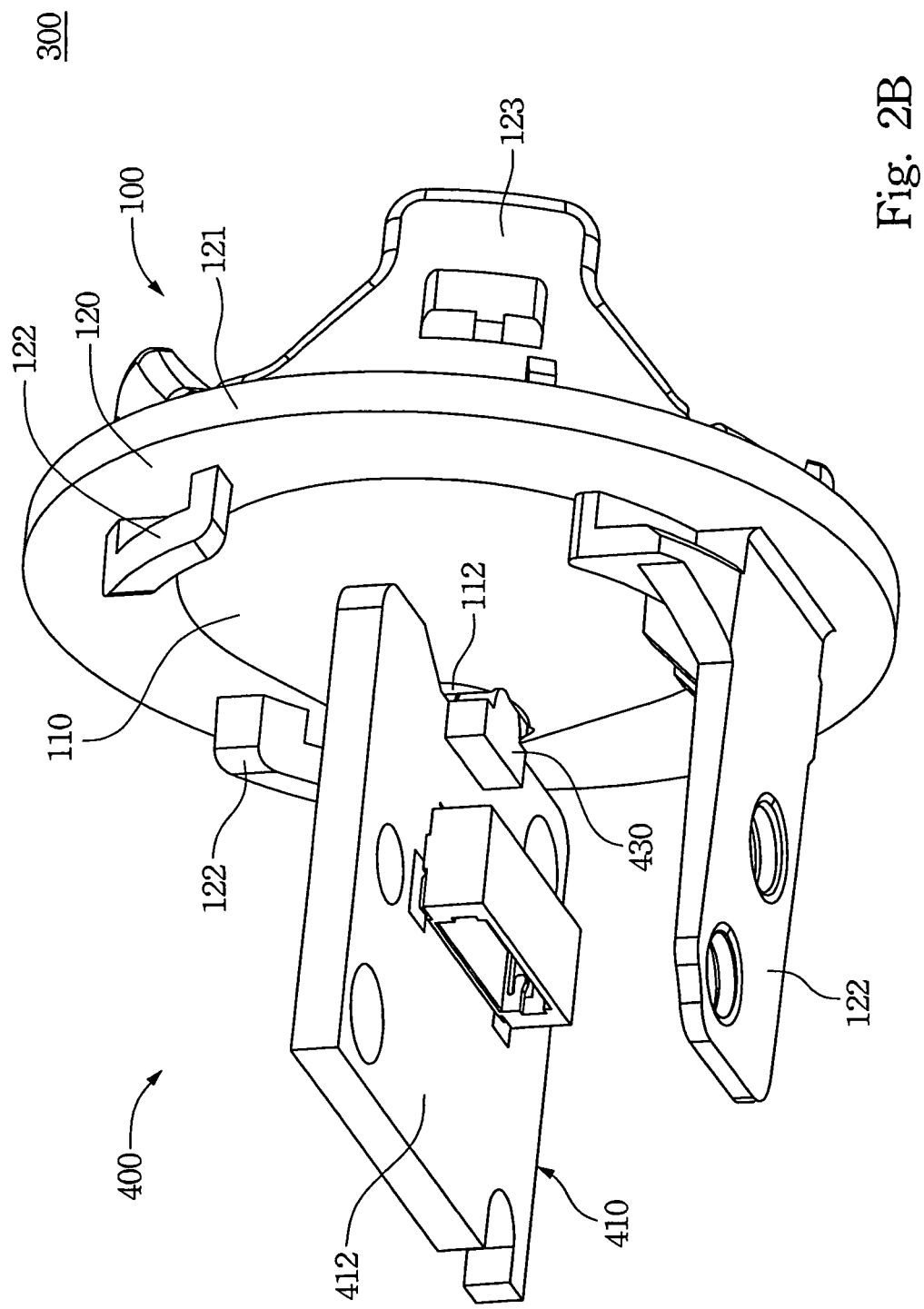

Refer to FIG. 2A and FIG. 2B in which FIG. 2A and FIG. 2B illustrate a light irradiation module 300 according to another embodiment of the present invention observed from two different directions.

The light irradiation module 300 includes a light guide member 100 mentioned above and a light source 400. The light source 400 includes a circuit board 410, a first LED element 420 and a second LED element 430. The circuit board 410 has a first side 411 (FIG. 2A) and a second side 412 (FIG. 2B) opposite each other. The first LED element 420 is mounted on the first side 411 of the circuit board 410 and extended into the opening 112 (FIG. 2A); the second LED element 430 is mounted on the second side 412 of the circuit board 410 and extended into the opening 112 (FIG. 2B). Thus, the first LED element 420 neighboring to one part of the light incident surface (i.e. inner surface 113) can irradiate light beams towards the part of the light incident surface (FIG. 2A), and the second LED element 430 neighboring to the other part of the light incident surface can irradiate light beams towards the other part of the light incident surface (FIG. 2B).

Specifically, the opening 112 of the cone shaped body 110 can be formed as a rectangle (as shown in FIG. 1A and FIG. 1B) or a circle (not shown). When the opening 112 of the cone shaped body 110 is shaped as a circle, there is one inner surface for the light incident surface surrounding the opening 112. When the opening 112 of the cone shaped body 110 is shaped as a rectangle (FIG. 1A or FIG. 1B), there are four inner surfaces 113 surrounding the opening 112 for being the light incident surfaces (FIG. 1A or FIG. 1B), and the first LED element 420 and the second LED element 430 can be tightly held in the opening 112 by each corner 114 (FIG. 2A) of the opening 112 between each two inner surfaces 113. Also, in order to distribute lights to the light emitting surface evenly, the material of cone shaped body 110 is mixed with colored particles such as white color flour particles. Thus, the colored particles averagely spread in the cone shaped body 110 provide evenly distributed lights from the first LED element 420 and the second LED element 430 emitted thereto.

In the specification, the first LED element 420 and the second LED element 430 are not limited in types, colors and irradiation angles. The first LED element 420 and the second LED element 430 respectively can be a top viewed LED element (not shown) or a side-viewed LED element (as shown in FIG. 2A and FIG. 2B). The first LED element 420 and the second LED element 430 can respectively irradiate lights with the same color (e.g. blue, green, orange or others) or different colors (e.g. blue, green, orange or others). The irradiation angles of the first LED element 420 and the second LED element 430 can be in a range of 65-130 degrees. Note that the irradiating range of the first LED element 420 and the second LED element 430 preferably should cover the inner surfaces 113 of the opening 112.

Figure 3:
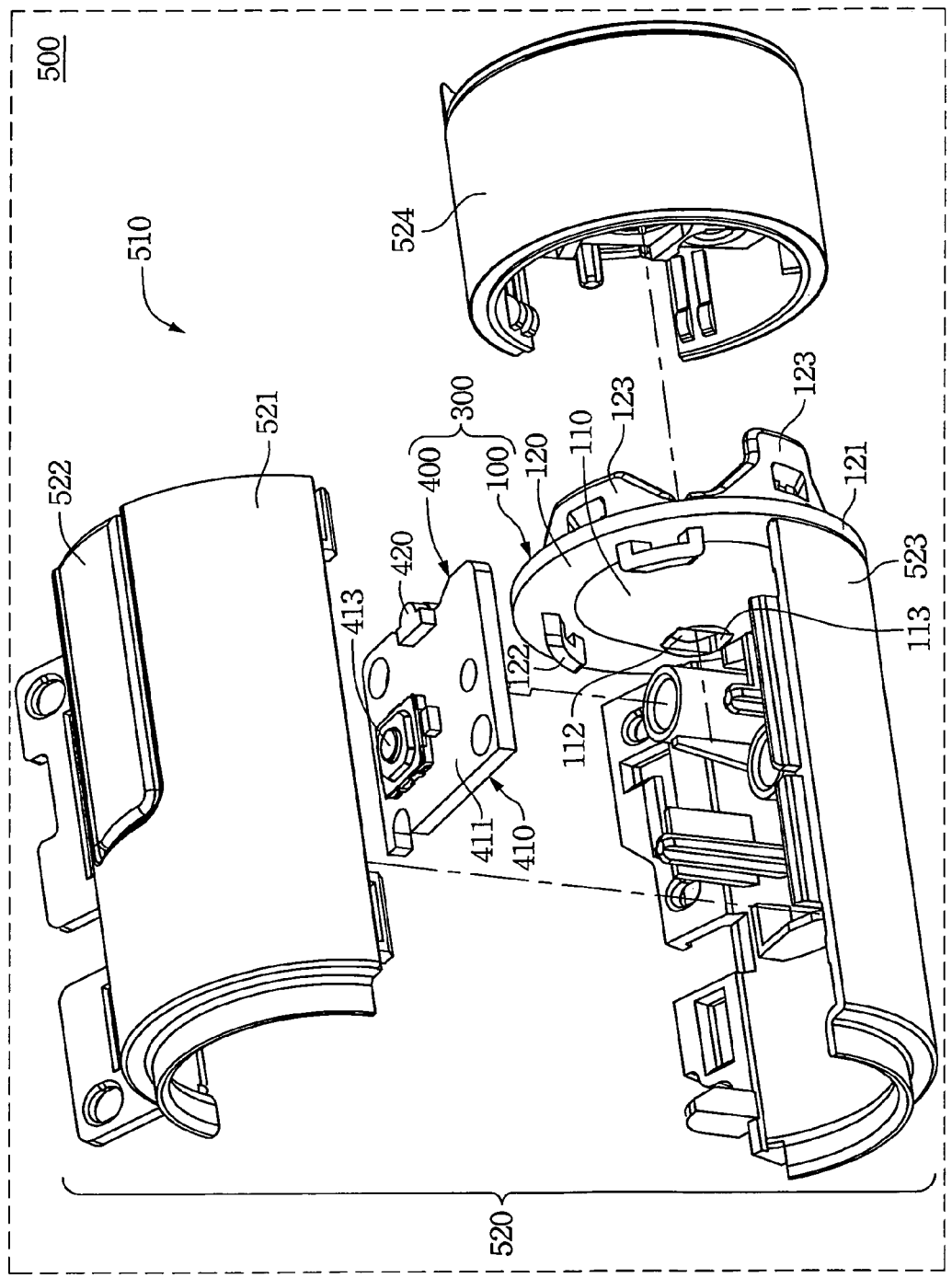
FIG. 3 illustrates an exploded view of a pivot of a laptop according to the other embodiment of the present invention.
Figure 4:
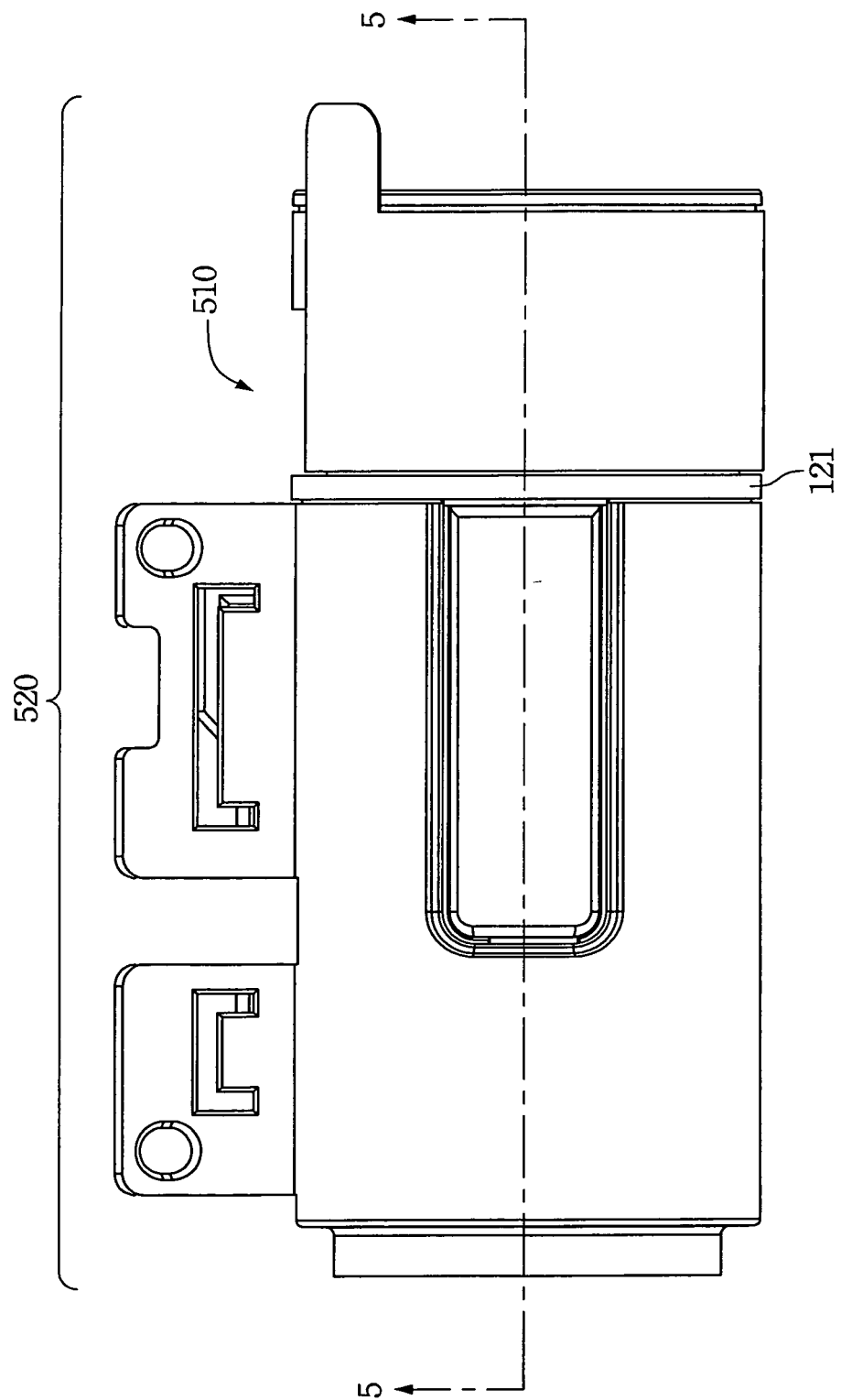
FIG. 4 illustrates an assembled view of the pivot in FIG. 3.
Figure 5:
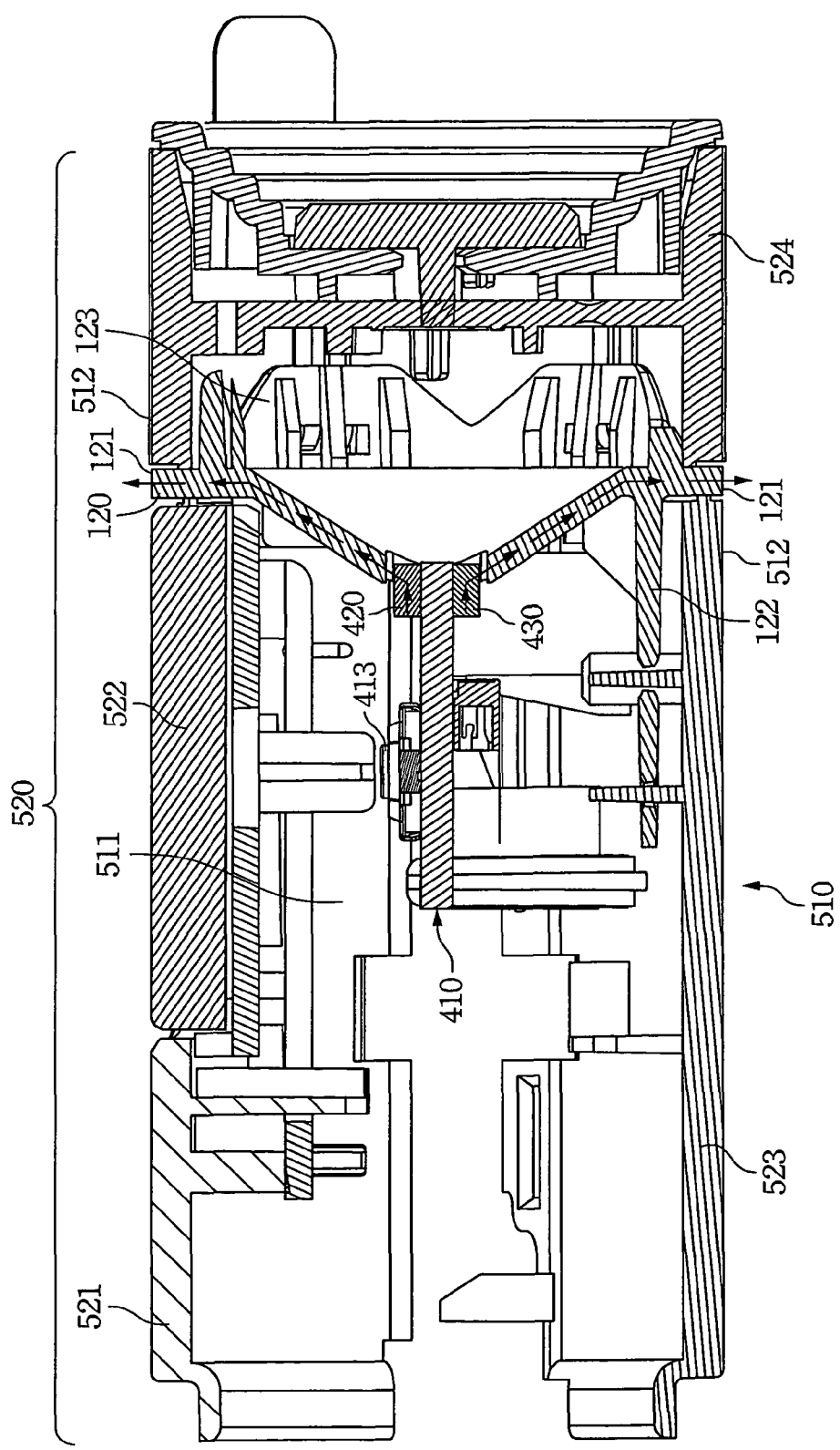
FIG. 5 illustrates a cross-sectional view taken along line 5-5 of FIG. 4.

Refer to FIG. 3, FIG. 4 and FIG. 5 in which FIG. 3 illustrates an exploded view of a pivot 520 of a laptop 500 according to the other embodiment of the present invention, FIG. 4 illustrates an assembled view of the pivot 520 in FIG. 3, and FIG. 5 illustrates a cross-sectional view taken along line 5-5 of FIG. 4.

In the embodiment, the light irradiation module 300 can be implemented to an electric device. The electric device provided in the present invention includes a case 510, the light guide member 100 and the light source 400 mentioned above.

The case 510, a column type of shell, has an internal space 511 therein and an external surface 512 thereon (FIG. 5). The light irradiation module 300 is fixed in the internal space 511 of the case 510, and the circular rim surface 121 of the ring shaped flange 120 is exposed outwards the external surface 512 of the case 510 to encircle the external surface 512 of the case 510. In other words, the circular rim surface 121 could be regarded as a portion, which can emit lights from therein, of the external surface 512.

Thus, when lights radiatively emitted from the first LED element 420 and second LED element 430 enter into the cone shaped body 110 via the inner surfaces 113 of the opening 112, the lights are simultaneously and radiatively guided towards the circular rim surface 121 of the ring shaped flange 120 as the light emitting surface to provide a ring shaped plane light source surrounding the case 510 (FIG. 5).

The light irradiation module 300 can be implemented to any kinds of electric device with a ring shaped plane light source such as a laptop, a cell phone, an indicator, an illumination device or so on. Exemplarily, the electric device can be a laptop 500, and the light irradiation module 300 is installed in a pivot 520 of the laptop 500.

Specifically, the case 510 for pivot 520 includes an upper shell 521, a lower shell 523 and a cover 524. The upper shell 521 and the lower shell 523 fit with each other so that the upper shell 521 can be combined on one side of the lower shell 523. The light guide member 100 has some first securing portions 122 and some second securing portions 123. The first securing portions 122 are extended from one side of the ring shaped flange 120, and the second securing portions 123 are extended from the other side of the ring shaped flange 120 (FIG. 5).

The light guide member 100 is secured on both the upper shell 521 and the lower shell 523 with the first securing portions 122, particularly, the first securing portions 122 is between the upper shell 521 and the lower shell 523 and covered thereby after combined together (FIG. 5). Also, the light guide member 100 is secured on the cover 524 with the second securing portions 123, particularly, the light guide member 100 is disposed between the cover 524 and the circular rim surface 121 of the ring shaped flange 120 is disposed and exposed after combined together (FIG. 5). Furthermore, the upper shell 521 is provided with a power button 522, and the circuit board 410 is provided with a power switch 413 arranged on the first side 411 thereof and aligning to the power button 522. Since the circuit board 410 is fixed on the lower shell 523 as well, when the power button 522 is pushed to turn on the power switch 413, the laptop is booted (FIG. 5).

To sum up, the light irradiation module and the electric device of the present invention capable of providing a ring shaped plane light source saves disposing space of the electric device for accommodating the light guide plate, so as to provide other space for other element to install, also, the light irradiation module and the electric device of the present invention only uses two of LED elements so as to further save the cost of light source.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A light guide member, comprising:
a cone shaped body with a rectangular opening at an apex of one end of the cone shaped body, and a ring shaped flange extended from a circular rim of the other end of the cone shaped body,
wherein the rectangular opening is surrounded by four inner surfaces collectively defining a light incident surface, and any two connecting inner surfaces form a corner recess so that the light incident surface has four corner recesses, and the four corner recesses are used for tightly fixing two LED elements in the rectangular opening, and a circular rim surface of the ring shaped flange surrounding the cone shaped body defines a light emitting surface.

2. The light guide member according to claim 1, wherein the cone shaped body is mixed with colored particles.

3. A light irradiation module; comprising:
a light guide member according to claim 1; and
a light source, comprising:
a circuit board with a first side and a second side opposite each other;
a first LED element disposed on the first side of the circuit hoard, extended into the rectangular opening, tightly fixed by two of the four corner recesses, and being capable of irradiating lights towards one part of the light incident surface; and
a second LED element disposed on the second side of the circuit board, extended into the opening, tightly fixed by the other two of the four corner recesses, and being capable of irradiating lights towards the other part of the light incident surface.

4. The light irradiation module according to claim 3, wherein the first LED element and the second LED element are both a side-viewed LED.

5. The light irradiation module according to claim 3, wherein the first LED element and the second LED element respectively irradiate lights with the same color or different colors.

6. An electric device, comprising:
a case with an internal space therein, and an external surface of the case having a ring shaped notch thereon;
a light irradiation module disposed in the internal space, the light irradiation module comprising:
a light guide member comprising a cone shaped body with a rectangular opening at an apex of one end of the cone shaped body, and a ring shaped flange extended from a circular rim of the other end of the cone shaped body, the ring shaped flange extending past the ring shaped notch to be exposed from the case, with a circular rim surface of the ring shaped flange encircling the case,
wherein the rectangular opening is surrounded by four inner surfaces collectively defining a light incident face, and any two connecting inner surfaces form a corner recess so that the light incident face has four corner recesses, and the circular surface of the ring shaped flange defines a lighting surface; and
a light source, comprising:
a circuit board;
two LED elements respectively mounted on two opposite sides of the circuit hoard, and both extending into the same rectangular opening for irradiating lights towards the light incident face, respectively, and being respectively tightly fixed by the four corner recesses.

7. The electric device according to claim 6, wherein the electric device is a laptop.

8. The electric device according to claim 7, wherein the case comprising:
an upper shell;
a lower shell fit to the upper shell for combining to one side of the upper shell, and securing the circuit board and the light guide member; and
a cover securing the light guide member, wherein the circular rim surface of the circular rim is disposed and exposed from the ring shaped notch sandwiched between the cover and one end side of the upper shell and the lower shell combined together.

9. The electric device according to claim 8, wherein the light guide member further has a plurality of first securing portions extended from one side of the ring shaped flange for securing both the upper shell and the lower shell, and a plurality of second securing portions extended from the other side of the ring shaped flange for securing the cover.

10. The electric device according to claim 6, wherein the LED elements are side viewed LEDs.

11. The electric device according to claim 6, wherein the LED elements respectively irradiate lights with the same color or different colors.

12. The light guide member according to claim 1, wherein the rectangular opening penetrates through the cone shaped body from one side thereof to the other side thereof.

13. The light guide member according to claim 1, wherein the cone shaped body has a sloped conical surface surrounding the rectangular opening and connecting the one end thereof and the other end thereof.

14. The electric device according to claim 6, wherein the rectangular opening penetrates through the cone shaped body from one side thereof to the other side thereof.

15. The electric device according to claim 6, wherein the cone shaped body has a sloped conical surface surrounding the rectangular opening, and connecting the one end thereof and the other end thereof.

* * * * *